United States Patent
Van Der Heijden

(10) Patent No.: US 8,706,686 B2
(45) Date of Patent: Apr. 22, 2014

(54) METHOD, COMPUTER SYSTEM, COMPUTER PROGRAM AND COMPUTER PROGRAM PRODUCT FOR STORAGE AND RETRIEVAL OF DATA FILES IN A DATA STORAGE MEANS

(75) Inventor: Antonius Nicolaas Adrianus Van Der Heijden, Leende (NL)

(73) Assignee: Split-Vision Kennis B.V., Leende (NL)

( * ) Notice: Subject to any disclaimer, the term of this patent is extended or adjusted under 35 U.S.C. 154(b) by 793 days.

(21) Appl. No.: 11/022,045

(22) Filed: Dec. 23, 2004

(65) Prior Publication Data

US 2005/0198077 A1    Sep. 8, 2005

Related U.S. Application Data

(60) Provisional application No. 60/546,625, filed on Feb. 19, 2004.

(30) Foreign Application Priority Data

Dec. 24, 2003  (NL) ..................................... 1025129

(51) Int. Cl.
| | | |
|---|---|---|
| *G06F 7/00* | (2006.01) | |
| *G06F 17/00* | (2006.01) | |
| *G06F 17/30* | (2006.01) | |
| *G06F 12/00* | (2006.01) | |
| *G06F 15/16* | (2006.01) | |
| G06F 3/06 | (2006.01) | |
| G06F 9/445 | (2006.01) | |
| G06F 9/44 | (2006.01) | |

(52) U.S. Cl.
CPC .... *G06F 17/30286* (2013.01); *G06F 17/30067* (2013.01); *G06F 3/067* (2013.01); *G06F 17/30864* (2013.01); *G06F 17/30867* (2013.01); *G06F 8/60* (2013.01); *G06F 8/24* (2013.01)

USPC .......................... 707/609; 707/705; 707/899

(58) Field of Classification Search
CPC .................... G06F 17/30256; G06F 17/30067; G06F 17/30864; G06F 17/30867; G06F 3/067; G06F 8/60; G06Q 10/06; B23K 9/0953
USPC ........ 705/5, 26; 707/1, 7, 102, 203, 200, 609, 707/705, 899; 709/206
See application file for complete search history.

(56) References Cited

U.S. PATENT DOCUMENTS 5,253,166 A * 10/1993 Dettelbach et al. ................ 705/5
5,924,090 A *  7/1999 Krellenstein .......................... 1/1

(Continued)

FOREIGN PATENT DOCUMENTS

EP    1225516 A1 *  7/2002    .............. G06F 17/30

OTHER PUBLICATIONS

Shackelford et al., The Architecture and Implementation of a Distributed Hypermedia Storage System, Dec. 1993, ACM Press, pp. 1-13.*

(Continued)

*Primary Examiner* — Ella Colbert
(74) *Attorney, Agent, or Firm* — Ladas & Parry, LLP

(57) ABSTRACT

A method and a computer system for storing data files in a data memory, wherein meta attributes comprising subject attributes, object attributes and relationships between these attributes are assigned to a data file. The meta attributes are selected from a meta attribute model or a knowledge card in which the meta attributes are structured in accordance with their meaning and context. A respective datafile is stored in the data memory on the basis of the meta attributes assigned thereto. The meta attributes assigned to a data file can be added to the data file or can be associated with the data file by means of a unique link.

16 Claims, 9 Drawing Sheets

(56) References Cited

U.S. PATENT DOCUMENTS

| | | | |
|---|---|---|---|
| 6,047,289 A * | 4/2000 | Thorne et al. | 1/1 |
| 6,327,593 B1 * | 12/2001 | Goiffon | 707/102 |
| 6,389,412 B1 * | 5/2002 | Light | 707/825 |
| 6,446,076 B1 * | 9/2002 | Burkey et al. | 704/270.1 |
| 6,519,612 B1 * | 2/2003 | Howard et al. | 707/200 |
| 6,708,189 B1 * | 3/2004 | Fitzsimons et al. | 707/205 |
| 6,742,003 B2 * | 5/2004 | Heckerman et al. | 1/1 |
| 6,910,029 B1 * | 6/2005 | Sundaresan | 1/1 |
| 7,076,453 B2 * | 7/2006 | Jammes et al. | 705/26 |
| 7,127,472 B1 * | 10/2006 | Enokida et al. | 707/103 Y |
| 7,257,599 B2 * | 8/2007 | Sauermann et al. | 1/1 |
| 7,363,359 B1 * | 4/2008 | Tripathy et al. | 709/223 |
| 7,711,753 B2 * | 5/2010 | Krishnaswamy et al. | 707/802 |
| 2001/0029510 A1 * | 10/2001 | Tokui | 707/200 |
| 2002/0049689 A1 * | 4/2002 | Venkatram | 706/45 |
| 2002/0059325 A1 * | 5/2002 | Beizer et al. | 707/203 |
| 2003/0069874 A1 * | 4/2003 | Hertzog et al. | 707/1 |
| 2003/0097443 A1 * | 5/2003 | Gillett et al. | 709/225 |
| 2003/0158836 A1 * | 8/2003 | Venkatesh et al. | 707/1 |
| 2003/0217117 A1 * | 11/2003 | Dan et al. | 709/218 |
| 2003/0233631 A1 * | 12/2003 | Curry et al. | 717/100 |
| 2004/0162879 A1 * | 8/2004 | Arcuri et al. | 709/206 |
| 2005/0066338 A1 * | 3/2005 | Bloesch et al. | 719/328 |
| 2006/0217990 A1 * | 9/2006 | Theimer et al. | 705/1 |

OTHER PUBLICATIONS

Jim Dray and Terresa Schwarzhoff; ITL Bulletin; "Overview: The Government Smart Card Interoperability Specification"; Jul. 2002; pp. 1-4.*

PR Newswire; "Moreover Offers Web Parts to Deliver News Search for Microsoft's Sharepoint Portal Server" May 1, 2001; pp. 1-2.*

M2 Presswire Coventry; "Microsoft: New Version of Sharepoint Portal Server provides enterprise scalability, personalisation and collaboration to customers; Microsoft Office Sharepoint Portal Server 2003 connects users, teams and enterprise applications"; Apr. 8, 3003; pp. 1-4.*

Qin, Jian and Wesley, Kathryn; "Web indesing with meta fields; A survey of Web objects in polymer chemistry"; Information Technology & Libraries, v17, n3; Sep. 1998; pp. 1-11.*

* cited by examiner

METHOD, COMPUTER SYSTEM, COMPUTER PROGRAM AND COMPUTER PROGRAM PRODUCT FOR STORAGE AND RETRIEVAL OF DATA FILES IN A DATA STORAGE MEANS

BENEFIT OF EARLIER APPLICATIONS

The benefit and priority are claimed from the U.S. provisional patent application Ser. No. 60/546,625 filed Feb. 19, 2004 and the Netherlands patent application 1025129 filed Dec. 24, 2003.

FIELD OF THE INVENTION

The present invention relates to the field of data storage and data retrieval in/from a data memory, such as digital data in a digital memory of a computer-controlled information processing system.

BACKGROUND OF THE INVENTION

With the information processing systems, such as servers, data bases and personal computers known from the prior art, data files, such as documents or control program files and the like, also referred to as records, are either stored directly in the data memory according to a specific file structure and with a unique file name, or they are stored in a structured manner in folders with a unique folder name. Generally a user is free to select the name of the data file and/or the name of a folder within the bounds imposed by the information system.

In a business environment, a user will store data files in the form of a folder structure based on departmental or organisational attributes, for example. In this way a folder structure as known per se comprising a number of subfolders is obtained, which subfolders can in turn be subdivided into further subfolders, in which the respective data file is eventually stored.

As in many cases a user can choose the names of folders and subfolders and the names of data files himself, it is generally difficult for other users to store a respective data file within a suitable folder or retrieve a data file from the data memory. Not only for other users, but also for the user who set up and arranged the folder structure and who gave names to the files and folders and subfolders it is often difficult to store a data file having a specific information content in the data memory and retrieve it therefrom, in particular if an extensive folder structure is used in which a relatively large number of data files are stored. This is because the known manner of storing data files in a data memory is based on the files being located in folders and subfolders and on the location the document is given or has been given within a hierarchic folder structure.

From U.S. Pat. No. 6,389,412 a method and a system for retrieving stored documents are known wherein so-called meta attributes are created from the information content of a set of stored documents.

These meta attributes comprise a set of topic profiles, each topic profile defining a relationship between a topic and the documents or files relating thereto, together with document surrogates and a list of distinguishing terms.

The meta attributes can be searched on the basis of a user-defined search criterion for the purpose of retrieving a respective document or respective documents. These meta attributes are essentially a summary of the documents and take up less storage space than the original document itself, whilst they can be searched more quickly.

U.S. Pat. No. 5,924,090 likewise discloses a technique for selecting and arranging documents or data files from a data memory on the basis of a search criterion, which technique is based on the use of meta attributes associated with a document or a data file.

Although the retrieval of documents or data files can be facilitated in this manner, the known techniques do no provide a solution to the problem of obtaining a more structured manner of storing data files.

Accordingly, it is a first object of the invention to provide a solution to the technical problem of storing data files, such as digital documents and program files, in a data memory, such as a digital data memory of an information processing system, in such a manner that storage of a respective data file can take place more easily and more quickly, substantially independently of a respective user. All this in such a manner that a well-defined storage structure is provided, also at departmental or company level, which is transparent and accessible to different users and which eventually also leads to an easier and quicker retrieval of data files as well.

SUMMARY OF THE INVENTION

In order to accomplish that objective, the invention, in a first aspect thereof, provides a method for storing data files in a data memory, which method is characterized by the steps of:
  structuring meta attributes comprising subject attributes, object attributes and relationships between the attributes in a meta attribute model or knowledge card;
  assigning meta attributes to a data file based on the meta attribute model or knowledge card; and
  storing the data file in the data memory based on the meta attributes assigned thereto.

Unlike the known, location-bound storage structure in (names of) folders, the method according to the invention arranges for the storage of data files free from any form of hierarchic folder structure on the basis of the meta attributes assigned thereto, which have been structured in advance in a so-called meta attribute model or a knowledge card. Using the method according to the invention, a user or a computer application, as the case may be, no longer needs to define a folder structure for storing data files unequivocally in a data memory.

In contrast to the prior art as described above, the meta attributes according to the invention do not directly follow from the data file or the document that is to be stored, but they are associated with the file by selection thereof on the basis of the meta attribute model or the knowledge card.

The meta attributes are in fact character sequences, such as words, numbers or combinations of letters and numbers, with hierarchical, logical and/or associative ("mind mapping") relationships existing between the subject attributes and the object attributes.

With the method according to the invention, the context and the meaning assigned to the meta attributes have been structured in advance and are comprised in the meta attribute model or the knowledge card, also referred to as the knowledge file. A meta attribute model thus includes the context, i.e. a set of meta attributes with their meaning as is known and intended at a given point in time.

The respective meta attributes are arranged in logical interrelationships, edited, validated and laid down in a meta attribute model or a knowledge card or a knowledge file in advance by information managers or other designated persons within an organisation that makes use of a computer-controlled information processing system or, in the case of a personal computer, by the user in question himself.

The respective meta attribute model or knowledge card or knowledge file is presented to the user. By making a selection of meta attributes therefrom and assigning the selected meta attributes to a respective data file, the data file is stored in the data memory in accordance with the method according to the invention.

It will be appreciated that different meta attribute models or knowledge cards may be developed and presented for different applications, different processes, among which administrative processes, different organisations and different departments within an organisation, etc.

According to yet another embodiment of the method according to the invention, the data files and the meta attributes assigned thereto are stored in the data memory in such a manner that the respective meta attributes are added to a file and stored in the data memory together with this file.

According to a preferred embodiment of the method according to the invention, the meta attributes that have been assigned to a data file are associated with a respective data file by means of a unique link. This linking can be carried out on the basis of the file name, the date and other attributes of a respective file, which may depend in practice on a respective application to which the data files relate.

The unique link in question may be stored in a separate link file in a data memory, the link file and the data files may be stored in separate data memories or in the same data memory.

In yet another embodiment of the method according to the invention, the meta attributes in the meta attribute model or the knowledge card are grouped in a matrix of subject attributes and object attributes, with the relationships between the attributes being comprised in the arrangement of the attributes relative to each other in the matrix.

In meta attributes grouped in a matrix, a particular hierarchical relation or a logical and/or associative relation may exist at the level of a row of the matrix between character sequences present in separate columns of the matrix.

In yet another embodiment of the method according to the invention, a meta attribute model or a knowledge card is formed of subject files or subject cards and object files or object cards, which files or cards are interrelated on account of the relationships that exist between the subject attributes and the object attributes. Upon storage of a respective data file, the user can browse through the respective subject files or object files, for example, and also within a subject file or an object file.

A meta attribute model is not static and is subject to change both in size and in time. Note, it is not the value of the meta attributes that changes or can change, but the context of the value. New meta attributes can be added to meta attribute models, but also a different meaning in a new or altered context of a meta attribute. Within the framework of the invention, the term meta-meta attribute model may be used in that case. That is, the relationships between meta attribute models, their context and meaning, and the way in which these relationships can be defined, so that the invention has a self-learning aspect.

When the meaning of data at or in one of the meta attribute models or knowledge cards changes, the meta-meta attribute model arranges for all the meta attributes (the data, the values, the character combinations) to be carried through in all the other meta attribute models or knowledge cards as well, depending on their associative meaning, which may also have a historic value/meaning for that matter.

A word or a combination of words (character set, dataset, etc) may thus acquire more than one (historic or non-historic) meaning in the course of time by virtue of the meanings (in the meta-meta attribute model) and other relationships, therefore, thus making it possible to retrieve all the information that has been stored by means of the invention. Either a learning effect takes place on the basis of knowledge that is (historically) present (history), which is in turn projected onto/associated with the meta attribute models that are used for making information (data files) retrievable (in their interrelationship).

In a second aspect, the invention provides a method for retrieving from a data memory data files that have been stored therein in accordance with the first aspect of the invention as discussed in the foregoing, the method for retrieving data files being characterized by the steps of:

selecting one or more meta attributes from a meta attribute model or knowledge card;

selecting one or more data files stored in the data memory on the basis of the selected meta attributes; and presenting the or each data file that has been selected.

Upon retrieval of data files from a data memory, the meta attributes operate as a search profile or identification profile of a respective data file. In contrast to the prior art as discussed above, the meta attributes for retrieving a data file or document according to the invention are selected from a respective meta attribute model or a knowledge card.

In accordance with the method of the invention, the meta attributes for selecting a data file can be selected from a random meta attribute model or knowledge file or knowledge card. In a preferred embodiment of the invention, the respective meta attributes for retrieving a data file are selected from the meta attribute model or the knowledge card from which the meta attributes have been selected for storage of a respective data file in a data memory.

It is noted that the presentation of the meta attribute model or the knowledge card or the knowledge file for the storage of data files in a data memory may differ from the presentation of the meta attribute model or the knowledge card or the knowledge file for the retrieval of data files from a data memory, although the information content, i.e. the meta attributes, will be the same. It will be appreciated that changing and updating the meaning and the context assigned to meta attributes in a respective meta attribute model or knowledge card in accordance with the method of the invention makes it possible to automatically retrieve also documents or data files that were previously not stored within a specific context or in accordance with a specific meaning of meta attributes assigned thereto. Also in this case the self-learning aspect of the invention comes to the fore.

In accordance with the method of the invention, the meta attributes in the knowledge file or the knowledge card or the meta attribute model are selected in the order of subject attributes and object attributes, which subject attributes and object attributes may in turn be arranged in subject files or subject cards and object files or object cards, as a whole constituting the knowledge file or the knowledge card.

It will be understood that within an organisation, such as a company, but also for use on a personal computer, several knowledge files or knowledge cards may be defined with their mutual relationships, depending on a specific application or a specific information processing process.

In accordance with the method of the invention, the meta attributes that have been assigned to a data file can be altered by a user, among which a computer application or a process. Also the meta attributes present in a respective meta attribute model or a respective knowledge card, or a subject file or a subject card and an object file or an object card, can be extended or reduced by a user, among which a computer application or a process. The altering of meta attributes may be subject to certain conditions, of course, for example to the effect that such alterations may only be carried out by authorised persons or processes or applications.

The invention also provides a computer system comprising at least one processing and control processor and at least one data memory for storing data files therein under the control of the at least one processor, characterized by a unit for assigning meta attributes comprising subject attributes, object attributes and relationships between the attributes, to a data file from a meta attribute model or knowledge card, and a unit for storing the data file in the at least one data memory on the basis of the meta attributes that have been assigned thereto. Within the context of the present invention, the concept computer system is synonymous to information processing system, as already indicated in the foregoing.

In further embodiments of the computer system according to the invention, the unit for assigning the meta attributes and the unit for storing data files on the basis of the assigned meta attributes are arranged for carrying out the method for storage of data files in the data memory as described in the foregoing. In a preferred embodiment of the computer system according to the invention, the unit for assigning meta attributes and the unit for storing data files on the basis of the meta attributes assigned thereto are formed by the at least one processing and control processor.

The invention further provides a computer system comprising at least one processing and control processor and at least one data memory for storing data files therein under the control of the at least one processor, characterized by a unit for selecting one or more meta attributes and a unit for selecting one or more data files stored in the data memory on the basis of the selected meta attributes, and a unit for presenting one selected data file or all selected data files.

In yet another embodiment of the computer system according to the invention, the unit for selecting meta attributes and the unit for selecting one or more data files stored in the data memory on the basis of the meta attributes assigned thereto, as well as the unit for presenting the selected data files are arranged for carrying out the method as described above for the retrieval from a data memory of data files stored therein on the basis of meta attributes assigned thereto, as described in the foregoing.

According to yet another embodiment of the computer system according to the invention, the unit for selecting meta attributes and the unit for selecting a data file on the basis of the meta attribute assigned thereto consist of the at least one processing and control processor.

The invention also provides a computer program, comprising program code means for carrying out the steps of the method according to the invention, as well as a computer program product comprising program code means stored on a medium that can be read by a computer, such as a floppy disk, a hard disk, CD-ROM, DVD, USB memory stick, or a storage medium that can be accessed via a data network, such as the Internet or Intranet, when the computer program product is loaded in the main memory of a computer and is carried out by the computer.

According to the invention, the computer program and the computer program product are arranged for integration in or addition to a computer application for carrying out one or more of the embodiments of the method according to the invention in conjunction with the computer application in question.

The invention will be described in more detail hereinafter by means of examples and associated figures and illustrations, in relation to which it is noted that the invention as such is not restricted to the examples and/or the applications described herein.

DETAILED DESCRIPTION OF THE DRAWINGS

Figure 1:
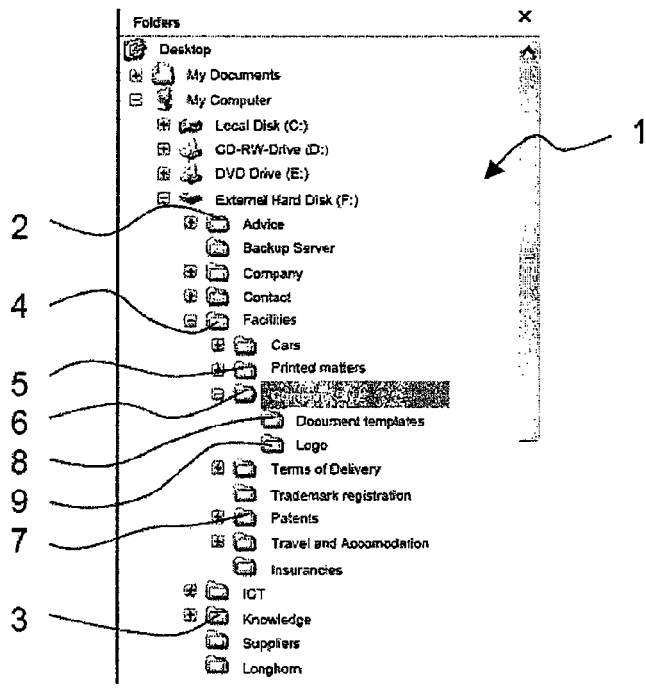
FIG. 1 shows an example of a known, usual folder structure for storage of data files in a data memory under the control of a usual control program for computers.

FIG. 1 shows a typical prior art folder structure 1, for example as used in Microsoft® operation systems, for the storage and retrieval of data files in/from a data memory of a computer system.

The folders in question, a few of which are indicated at 2, 3 and 4, each have a folder name, as shown by way of example in FIG. 1, which folders may furthermore be subdivided into subfolders 5, 6, which subfolders may in turn be divided into further subfolders, such as the further subfolders 8 and 9 of the subfolder 6. Each of the subfolders 2-9 may have data files and program files stored therein, each having their own unique name and file structure or extension.

Data files and program files can be stored in a folder by opening a respective folder by a mouse click and "dragging" the file in question to the folder, or by means of a control window, into which the name of a file can be written, as is known per se, for example from the Microsoft® operating software. According to this known folder structure 1, the data files are stored in (names of) folders and/or subfolders according to a location-bound storage structure. The location of a respective data file in the hierarchical folder structure 1 is determined by the folder in question in which the data file is stored.

Within the context of the present invention, the term data file is meant to include all files that contain information, such as documents and the like, but also all files and documents that enable a computer system to function, such as program and operating files and the associated documents.

As already discussed in the introduction, this existing folder structure 1 is unsuitable for quick and unequivocal storage of data files in a data memory, as a result of which problems arise also upon retrieval of a respective data file from the data memory, in particular in those cases where an extensive folder structure is used. Usually a document will have to be retrieved on the basis of specific knowledge of the user who stored the document. This is disadvantageous, in particular when other users, for example within a company, must store data files in order retrieve data files from a data memory for use in an information processing system.

Unlike the prior art as discussed above, the method according to the invention for storage of data files in a data memory is not based on the files being stored in (names of) folders and subfolders according to a location-bound storage structure or on the location that a data file is given within a hierarchical folder structure.

The invention is based on the use of subject attributes in combination with object attributes and the relationships between these attributes. Within the framework of the invention, these are indicated as such by the term meta attributes or meta knowledge. The meta attributes, which form a combination of logically interrelated attributes, are used for unique identification of a data file. The subject attributes may be tied to an organisation, i.e. depend on a specific information processing system or process. The subject attributes are defined in advance and structured in a meta attribute model or a knowledge file or a knowledge card, which designations are synonymous within the context of the present disclosure and which are used indiscriminately herein, as is the relation between these subject attributes and object attributes. The subject attributes and the relations between these attributes can be visualised as a group of meta attributes (meta knowledge), for example.

The meta attributes are structured, arranged into logical interrelationships, edited, validated and laid down in one or more meta attribute models or knowledge cards in advance by information managers or other designated users in accordance with the information requirements, the processing of information and the like within a respective organisation or company. From such a group of meta attributes an identification profile for uniquely identifying a data file can then be selected. This identification profile will form part of the unique identification of a data file and a unique identification of the data file in the data memory in which the file is stored.

Examples of identification profiles for various subjects or applications according to the invention are:
  Town and country planning; zoning plan; planning area; "Zwaluwpolder" area.
  Advice: information structure; document management systems.
  Employment; appointment to staff; employment contract.

Meta attributes have a specific meaning and are defined within a specific context. Consequently, the meta attributes relate a data file to a specific context via the meta attribute model or the knowledge card, as a result of which the meaning of such a data file can be understood. The meaning and the context of meta attributes in a meta attribute model are time-dependent, i.e. as meant at a specific point in time. The meaning may change with time, e.g. be extended, as a result of which a data file may be placed in a different context previously not seen or intended by a user. This constitutes a self-learning aspect of the invention.

Meta attribute models or knowledge cards are interrelated via corresponding meta attributes and their relations. The significance of a meta attribute is context-dependent, and consequently the relationship between meta attribute models is context-dependent, which can be referred to as a meta-meta attribute model. In other words, the meta-meta attribute model represents the learning capacity of the invention by finding and interpreting relationships between context and meaning of meta attributes. The meta-meta attribute model enables the addition of further meanings to all associatively related meta attributes in all meta attribute models or knowledge cards.

A meta attribute model or a knowledge file or a knowledge card can be represented as a collection of character sequences, such as words, numbers or combinations of letters and numbers, the meta attributes, between which a hierarchical, logical, associative or "mind mapping" relationship exists.

A certain hierarchical relation exists between all character sequences in, for example, separate columns of a matrix, at the level of the rows of the matrix, for example from the left to the right, and from the right to the left the related character sequences form identification profiles for data files for storage in and retrieval from a data memory in which they are (being) stored. The relation between the character sequences in question may also be a logical or an associative relation instead of a hierarchical relation.

From the hierarchical, logical or associative relations the identification profiles or search profiles are formed, which can be linked to a data file and which can be added to the data file, or be linked to a data file, i.e. to the name thereof or to another unique attribute or attributes of a data file, via a linking file. The link in question may in turn be laid down in the knowledge file or the knowledge card. If desired, it may be stored in the same data memory as the files or in another data memory, which is collectively accessible within an organisation or company, for example. The linking file, or the knowledge file or the knowledge card, is used in the manner according to the invention in that case for retrieving the file name or other unique attributes of a respective data file, and if applicable, a respective data memory or a memory section or the like in which the document is stored, and using the same for unique identification of the data file.

An example of a meta attribute model or a knowledge card according to the invention is visualised below in the form of a matrix. It concerns a knowledge file or a knowledge card for staff matters in an organisation or a company.

Knowledge Card Staff Matters

| Product | Subproduct | Process | Document or data file |
|---|---|---|---|
| Recruitment and selection | Staff recruitment | Recruiting staff | Recruitment ad |
| | | | Internal ad |
| | | | Web page |
| | | | External ad |
| | Application | Selecting staff | Invitation for 1st interview |
| | | | Preliminary rejection of applicants |
| | | | Invitation for 2nd interview |
| | | | Final rejection of applicants |
| | | | Letter of application |
| | | | Report selection procedure |
| | Unsolicited application | Selecting staff | Letter of application |
| | | | Letter in portfolio |
| Employment | Appointment to staff | Appoint to staff | Letter of appointment |
| | | | Deed of permanent employment |
| | | | Deed of temporary employment |
| | | | Letter of application of appointed person |
| | | | Application form of appointed person |
| | | | Medical certificate |
| | | | Employment contract |

Figure 2:
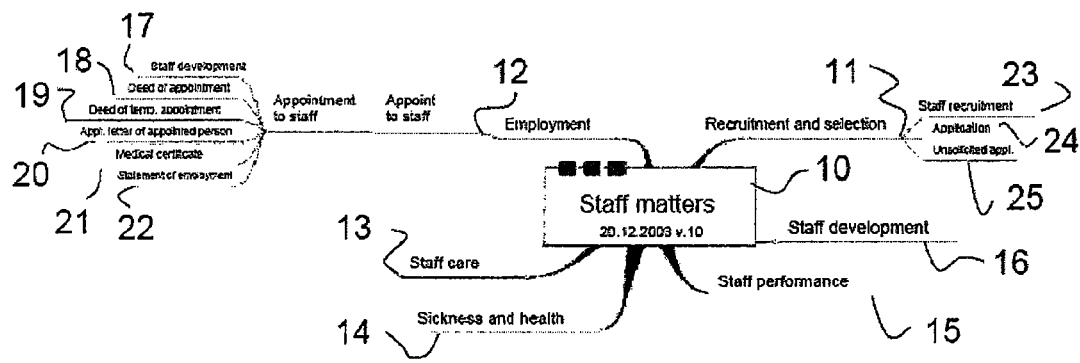
FIG. 2 shows a schematic representation of an associative or "mind map" relation according to the invention between subject attributes and object attributes for the subject "staff matters".

FIG. 2 shows a graphic representation of associative relations for the subject Staff matters 10. In addition to the aforesaid products Recruitment and selection 11 and Employment 12, further products of Staff matters are: Staff care 13, Sickness and health 14, Staff performance 15 and Staff development 16.

Object attributes of these subjects have been elaborated for Employment 12, being Letter of application 17, Deed of appointment 18, Deed of temporary appointment 19, Letter of application of appointed person 20, Medical certificate 21 and Employment contract 22. Object attributes for Recruitment and selection 11 are: Staff recruitment 23, Application 24 and Unsolicited application 25.

These subject and object attributes, as well as their interrelationships as shown in the above matrix, for example, form the meta attributes, on the basis of which data files relating to Staff matters 10 are identified and stored in and retrieved from a data memory. For the sake of clarity it is noted that the term data memory as used within the framework of the present disclosure and the invention is synonymous to a collection of data memories at the same location or, if necessary, at different physical locations.

According to the invention, the information processor, i.e. a user or a computer application, does not search directly in the data files or possibly in the folders, but first in the knowledge elements (the meta attributes) of the organisation. These knowledge elements are available in the knowledge file of the organisation and are used as a so-called "Add-on" or addition to an application for identification of a file name and, if necessary, for identification of a folder name.

Note: the invention does not require any knowledge of a folder structure or even of the construction thereof. Of course the invention can be used to the same advantage as described above by an information processor in a data memory comprising a folder structure. This makes it possible to use the information also in existing information processing systems in which data files are stored in a data memory.

Identification of the data file and at the same time of a folder name takes place not only in that the information processor makes a selection from a set of subject attributes, but also in that the information processor makes a selection from a logical set of object attributes. In addition to the use of the knowledge cards for identification of the document with subject attributes, object cards are used for selecting the object attribute in question for identification of a document name and for identification of a file name. Each meta attribute model or each knowledge card thus contains a predetermined logical (number of) relation(s) "reference" to one or more object cards, just like each object card contains the references to the predetermined relation(s) with one or more knowledge cards.

Object attributes are listed on an object card. An object card contains the meta attributes from an object administration, a CRM database, e.g. a table of street names (or land registry) or other Back Office System, or an authentic basic registration or source file. An object card may also include a link to data memories ("databases"), or to tables in a "data warehouse". The (combination of) selected object attributes are added to the identification or search profile.

Now we have an identification profile that has been composed. As a result of the combination of subject and object attributes and the (system) date and time (for version management), the data file, e.g. a combination of data documents, will be uniquely identified. From now on it is possible to use the unique identification upon (re-)storing, searching and retrieving the data file provided with the specific identification without having any knowledge or understanding of a folder structure.

Figure 3:
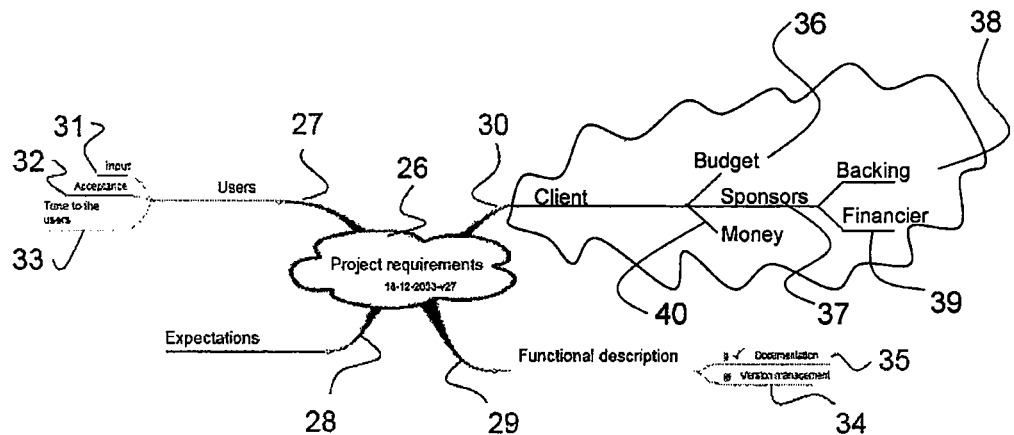
FIG. 3 shows a schematic representation of an associative or "mind map" relation according to the invention between subject attributes and object attributes for the subject "project conditions".

Analogously to FIG. 2, FIG. 3 shows by way of further example a graphic representation of associative relationships for the subject Project conditions 26, including products such as: Users 27, Expectations 28, Functional description 29 and Client 30. Object attributes of the Users 27 are, inter alia, Input or Entry 31, Acceptation 32 and Tune to users 33. Object attributes of Functional description are, for example, Version management 34 and Documentation 35. For the Client 30 object attributes are, for example: Budget 36, Sponsors 37, with sub-objects Backing 38 and Financier 39, and Money 40.

Since the invention, as already said before, establishes a multiple number of logical, associative and hierarchical relationships between subjects and objects, and since all these attributes are linked as specific meta attributes to the data file, such as a document, and since further attributes can be linked to a folder as specific attributes, it will become easier to retrieve data files and the folder.

Consequently, by searching in the logically composed identification profile, in the specific combination of meta attributes (subject and objects) of a document and/or in the specific combination of attributes of a folder in accordance with the method of the invention, the specific attributes for each data file are unique, they are different from each other whilst nevertheless being logically interrelated.

By allowing the information processor, such as a user, to "browse" through the knowledge file or the knowledge card during the storage process (pre-coordination), he or she will be able to use the terminology that is used within the organisation (relating to his thoughts, a process, knowledge, folders, applications, etc) unequivocally for identification of files.

Depending on the knowledge card that has been selected, the information processor can thus select the object-bound attribute (such as the name of a street or of a person, etc) from the object card(s) being presented in accordance with the invention. This will lead to a structured and manageable documentary information household.

This means that upon retrieval of a data file in a data memory, all the documents relating to a respective case or subject that have been uniquely identified within a unique folder can be found. The relation between data files (associated with each other) is not at the physical folder level but at a logical and relational level (virtual), viz. at the level of the identification profile composed of a selection of meta attributes from the knowledge file or the knowledge card and the subject files or subject cards and object files or object cards that are related thereto.

Summarizing the above, the invention is based on the following perception: the starting point is data that need to be stored; these data are related via meta attributes to a meta attribute model or a knowledge card; the meta attribute model consists of contexts, meanings assigned to meta attributes in dependence on the time and the environment, i.e. an application, a process, an organisation, a department or even a specific task; relationships are established between the contexts of the meta attributes, which relationships are further and further refined; these relations form the connection between the various contexts, which in turn forms the basis for the retrieval aspect of the data files; the fact is that the context of meanings and models (the connection) renders data files retrievable; a meta-meta attribute model is formed between new and existing meta attributes on the basis of the refinement of relationships and contexts; the value of the meta attributes remains, but the context and the meta attribute model change, including all layers therein.

Figure 4:
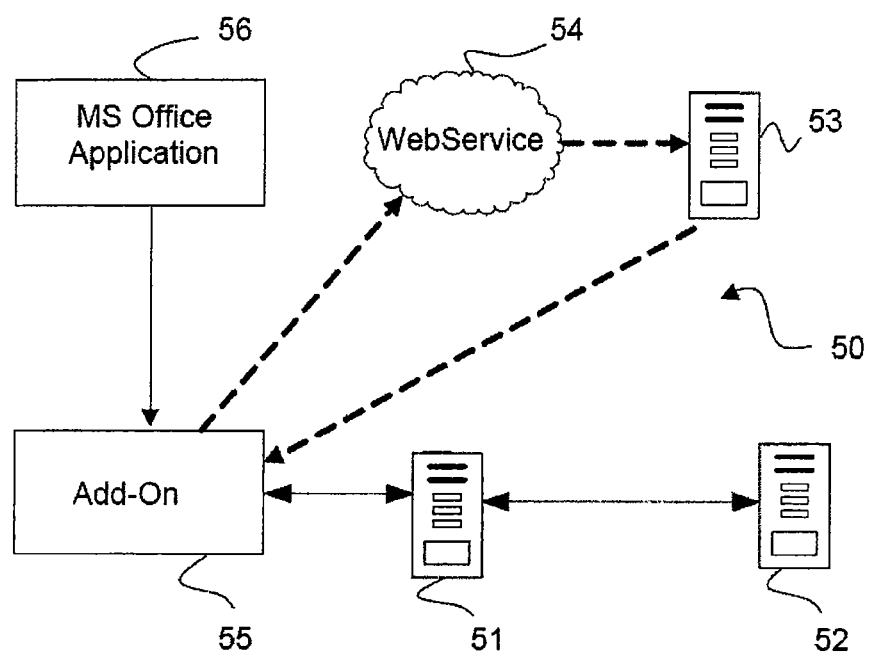
FIG. 4 schematically shows the technical architecture of a computer system according to the invention.
Figure 5:
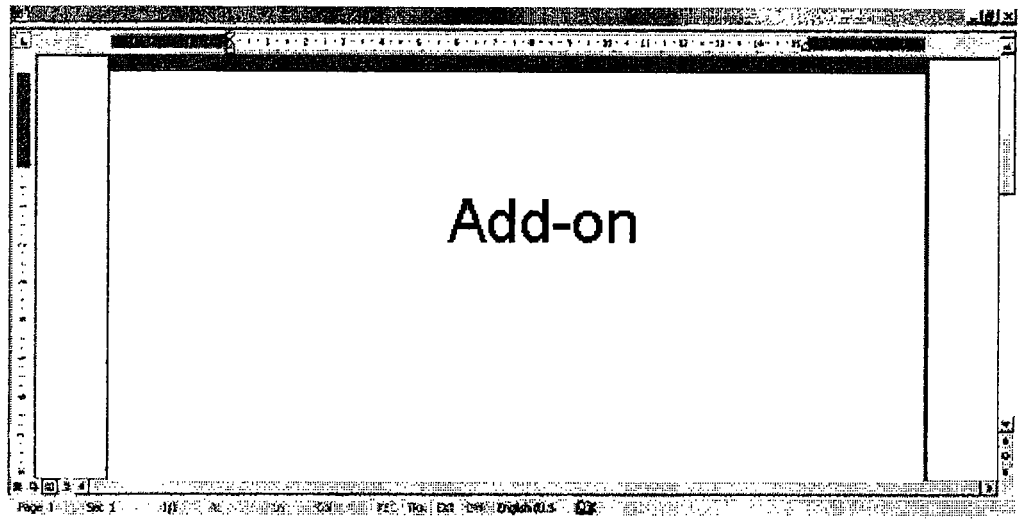
FIGS. 5-15 are schematic representations of display images as they occur when using the method according to the invention in an application on a computer system arranged in accordance with the invention.
Figure 6:
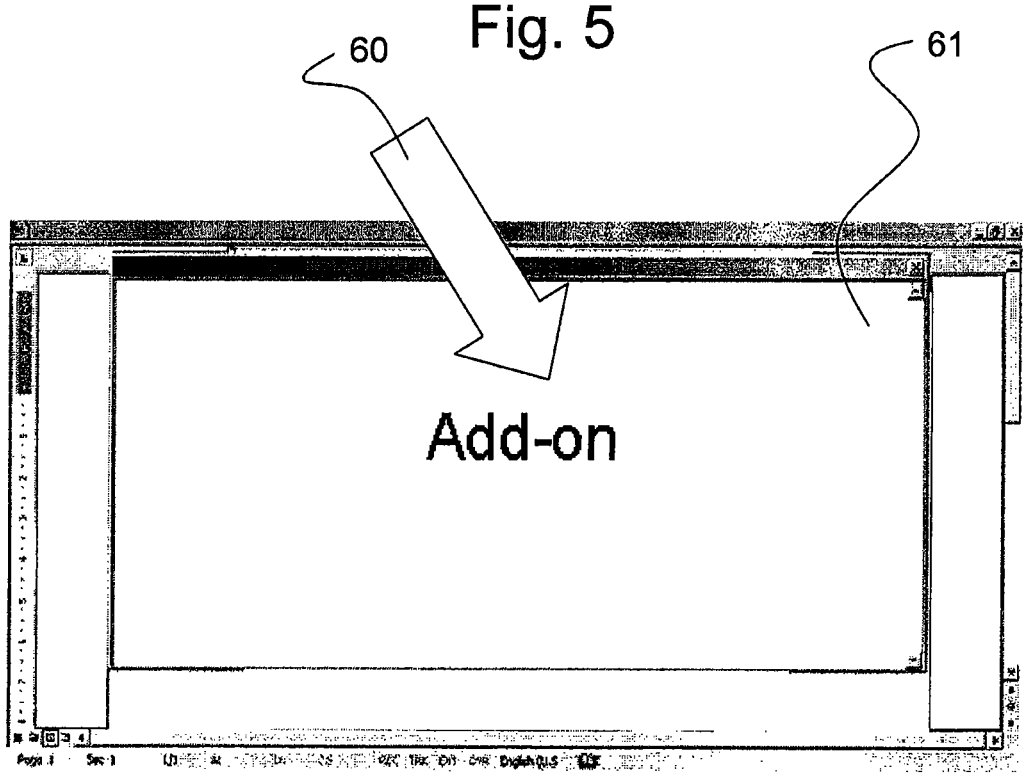
Figure 7:
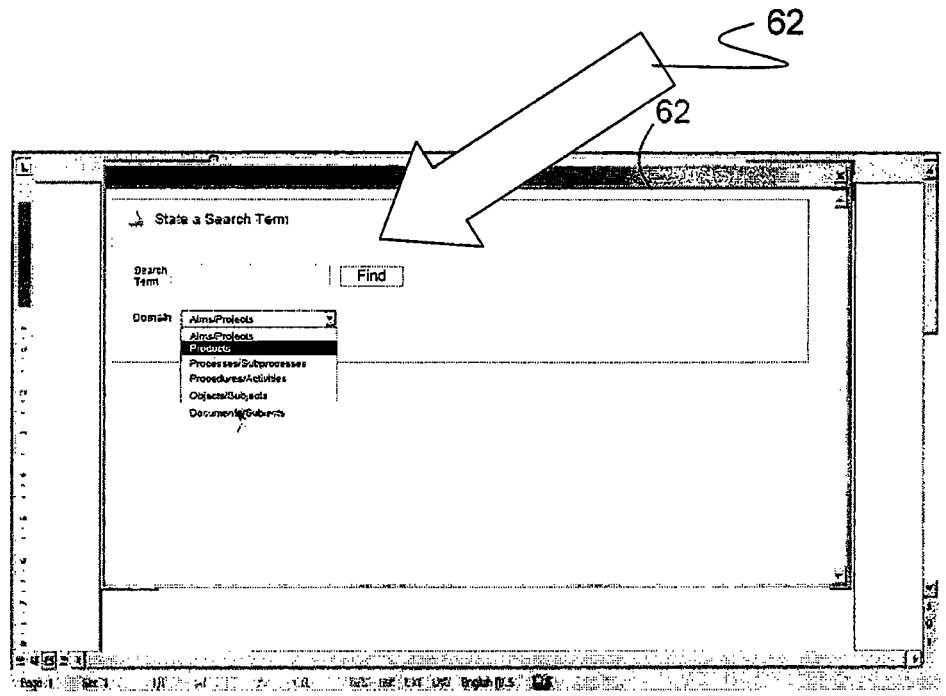
Figure 8:
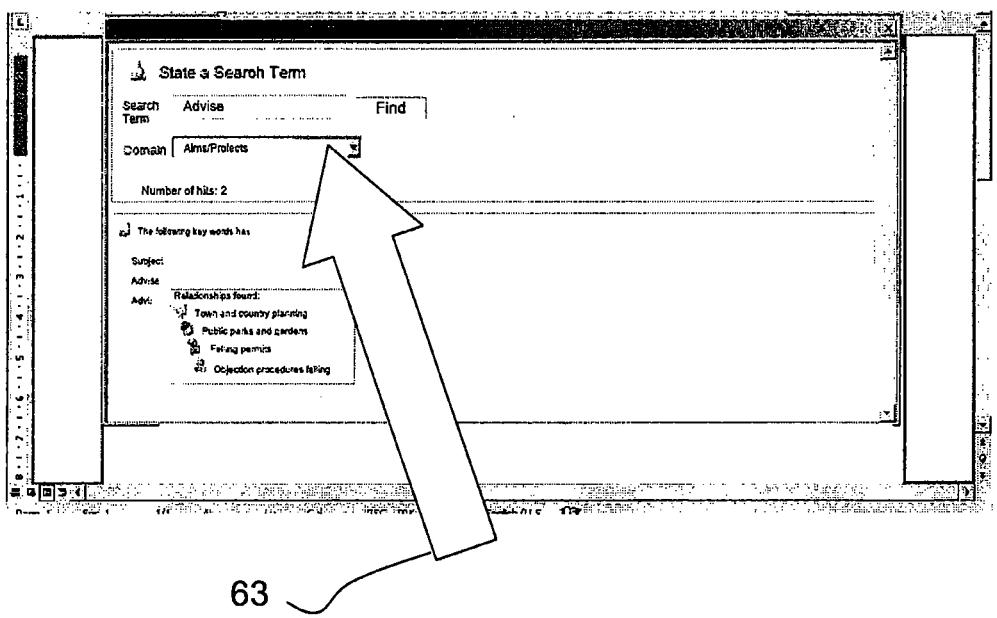
Figure 9:
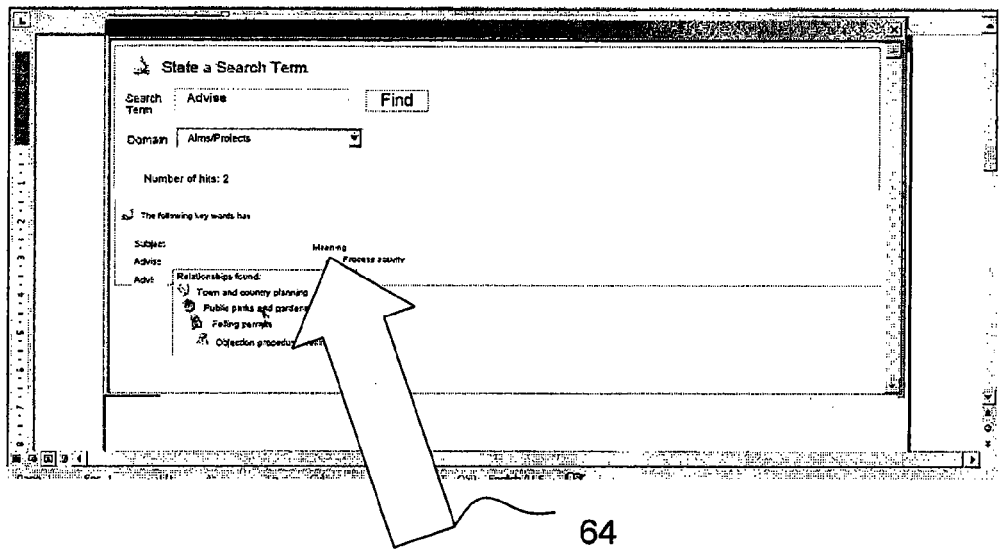
Figure 10:
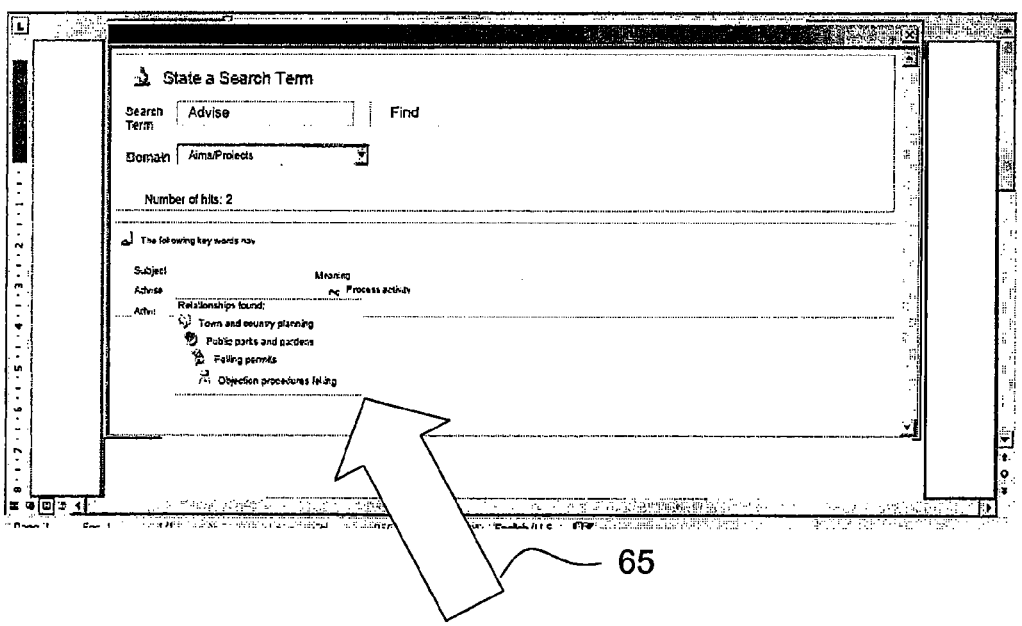
Figure 11:
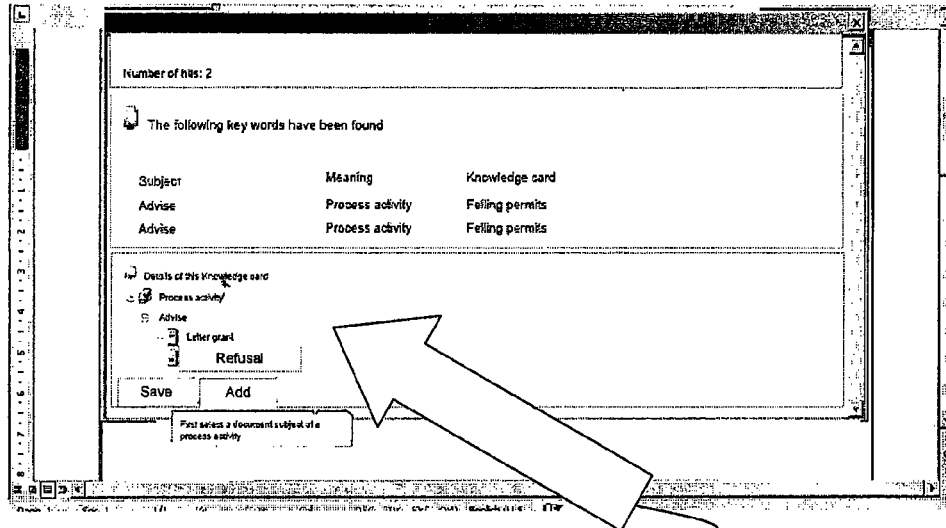

FIG. 4 shows an example of a computer system or information processing system 50 according to the invention. The computer system comprises a number of servers, viz. a so-called Web server 51 for Internet applications, a database server 52, which functions as the data memory, and a so-called SharePoint server 53. Reference numeral 54 refers to a so-called WebService, via which the SharePoint server 53 and the Web server 51 communicate with a computer program arranged for carrying out the method according to the invention when loaded in a computer, as discussed in the foregoing. In FIG. 4 the computer program is schematically illustrated with the name "Add-on" in block 55. The reason for this is that the computer program 55 in question can function as an added part or "Add-on" to an existing software application, such as MS Office® 56 of Microsoft®. The arrows in FIG. 2 indicate communication paths. Of course it is also possible to use the invention in computer systems that are less comprehensive than the one that is shown in FIG. 4, such as a single personal computer or computers linked in an internal company network.

In an example, the computer program or the computer program product according to the invention, also indicated by the name of Document Identification Manufacturer (DIM), runs as an "Add-on" functionality with Microsoft SharePoint®, which provides a platform for storing documents with meta attributes to be assigned thereto. Microsoft® has furthermore realised the integration of SharePoint® with the existing Microsoft Office® applications of Microsoft®, so that it links up perfectly with the information system within an organisation.

The added value that the DIM application provides, among others, is:

1st. Functionality.

"Browsing/searching" in a three-dimensional knowledge relationship by making use, both upon "Opening" and in the first part of "Save as", of:
 1st dimension; the singular and/or plural denotation (context/domain) of each subject attribute (word, key word, search word or the like);
 2nd dimension; the hierarchical relationship between the subject attributes (and their denotation), which has been laid down in advance in knowledge cards and which can be added "on the fly".
 3rd dimension; the logical relationship between the subject attributes of a specific knowledge card and the object attributes of the object card or object cards related thereto;

2nd. Functionality.

The combined use of these three-dimensional attributes in the 2nd part of "Save as":
 1st step; composing the document name consisting of a combination of a subject attribute and one or more object attributes as well as a date;
 2nd step; composing the record attribute (folder name) in dependence on the selected subject attribute for the file and thus the subject attribute for the file that is logically related thereto as well as the combination with one or more object attributes and, for example, a date.

The changing of the data in meta attribute models or knowledge cards can take place both in the DIM, i.e. via a management part thereof, and directly on the data memory or the database, in which the meta attribute models or the knowledge cards and their relationships are laid down, by other applications.

To create the link between Office® and SharePoint®, it has been elected to use a WebService 54 as an intermediate layer. This makes it easy to communicate from the application layer (Office®) with the external storage layer (SharePoint®). The knowledge card technology, as regards the data layer thereof, has been developed within Microsoft SQL Server®.

Now the operation of the invention in a Microsoft® software application will be explained with reference to FIGS. 5-15. The invention is not limited to Microsoft® products, of course.

The whole process commences when the user starts his Microsoft Office® Application, creates a document and wants to save this. Since the DIM provides a more targeted and structured manner of storage, selection of either one of the options a. "save as" or b. "save in knowledge data file" will result in the DIM being addressed within Office®. This is indicated by "Add-on" in FIG. 5.

Within the Office® application (MS Word® in this example) a window 61 with the DIM present therein is opened. See FIG. 6, indicated by the arrow 60. The content thereof that is present will be displayed in the Office® environment via a Web application.

The user can subsequently select his or her knowledge level by making a selection from the depth level of the desired search command in the selection box ("Domain"), indicated by the arrow 62. In the display example: product level. After entry of the search term (yet to be discussed), the search within the available knowledge cards will be carried out at the level "product" and all the words that occur at a hierarchically deeper level on the knowledge cards.

The deeper the level the user selects, the higher the knowledge level within which he or she searches. Within an organisation, managing staff will search at a fairly general level, whereas the professionals will search at a deep level, since they know directly what documents subjects they need.

In addition to enabling manual selection of the search level, the DIM will also statistically record the knowledge level of the user on the basis of his search pattern, so as to automatically gear (compute) his search action to his knowledge requirement in this way.

The user selects a word (subject attribute or object attribute) he wishes to use for storing his document or data file (e.g. "advise"). He can also use "wild cards" in this connection, which enables him to search also for parts of words (e.g. *advise* searches in every column in which the word "advise" occurs).

The user selects the option "Search", after which the "Add-on" searches the available knowledge cards, with the depth as already indicated as the search domain. See FIG. 8, arrow 63.

After the DIM gets the search command, the DIM will present a set of results to the user. In the survey of results, a division into columns is made. See FIG. 9, arrow 64.
 i. Subject: the search term (input by the user) that has been found;
 ii. Meaning: the meaning thereof as the subject occurs on the knowledge card, or the location (name of the column) on the knowledge card where the returned term can be found.
 iii. Number: the number of knowledge cards on which this combination can be found.

If it appears that this search word can be found on several cards, selection of the word will present the user with an option showing the name of the knowledge cards on which the word occurs.

| Key word | Name knowledge card |
|---|---|
| Advise | Felling permit |
| Advise | Town and country planning |

There are two possibilities now: See FIG. 10, arrow 65.

1. When the user moves his mouse cursor over the search word that is only present on 1 knowledge card, the whole of higher levels on the knowledge card is displayed in a "tool tip".

2. If the subject being clicked on appears to consist of several knowledge cards, a selection for the knowledge card in question is displayed first. In that case the "tooltip" is displayed when the user moves the mouse cursor over the name of the knowledge card.

When the user selects the search word ADVISE in question (or the denotation PROCESS ACTIVITY displayed beside the word), the whole of underlying relationships and attributes is displayed in a dynamically constructed knowledge tree structure (i.e. not a folder structure) ("The details of that knowledge card"). See FIG. 11, arrow 66.

This knowledge tree structure can be folded out by clicking on the + and − symbols beside the words. When the user clicks on the deepest level (e.g. Refusal=the subject of the document, within the process activity "Advise"), all the hierarchical relationships that exist above that level will be retrieved as meta attributes and be put out for being linked to the document or the data file as subject attributes.

Apart from the existing relationships on the knowledge cards, relationships may also exist between the knowledge cards and (the external) organisations, objects or relations. At the level of the knowledge card, the manager lays down the nature of these relationships (for example, a relationship exists between the product knowledge card "Felling permit" and a land registry number, a street name, etc). The DIM determines the possible object relationships for this knowledge card (and this subject) and presents the user with an option, which the user can select from a menu, for example:

[ ] street name
[ ] land registry number

For each option, the user is presented with a window in which he must select the recorded data within the organisation with regard to the desired relationship (e.g. "Kalverstraat" is selected as the street name). The user selects the required data and the "Add-on" automatically proceeds with the next step (relationship).

The user can indicate by means of a selection box whether he wishes to be presented with a survey of all the selections he has made once again before storing the document with the selected attributes. If he clicks the selection box, the image as shown in FIG. 12 will be displayed, indicated by the arrow 67.

Figure 12:
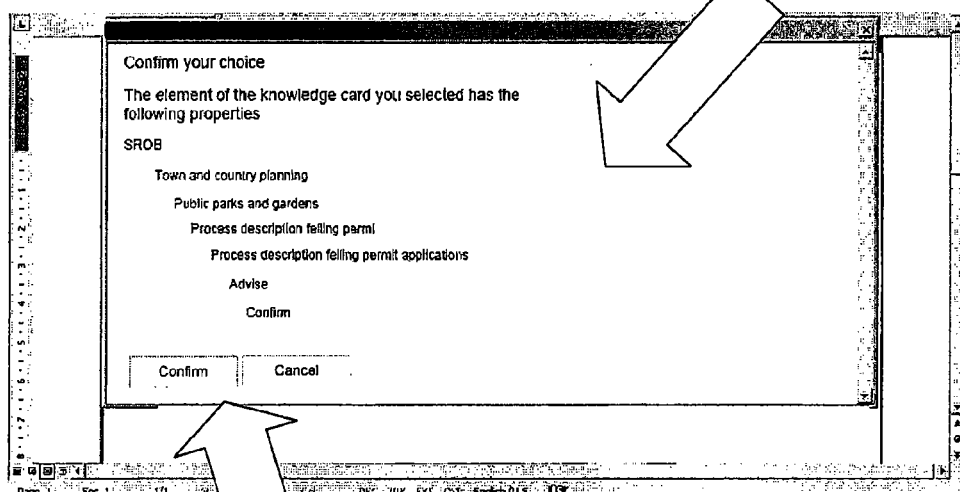
Figure 13:
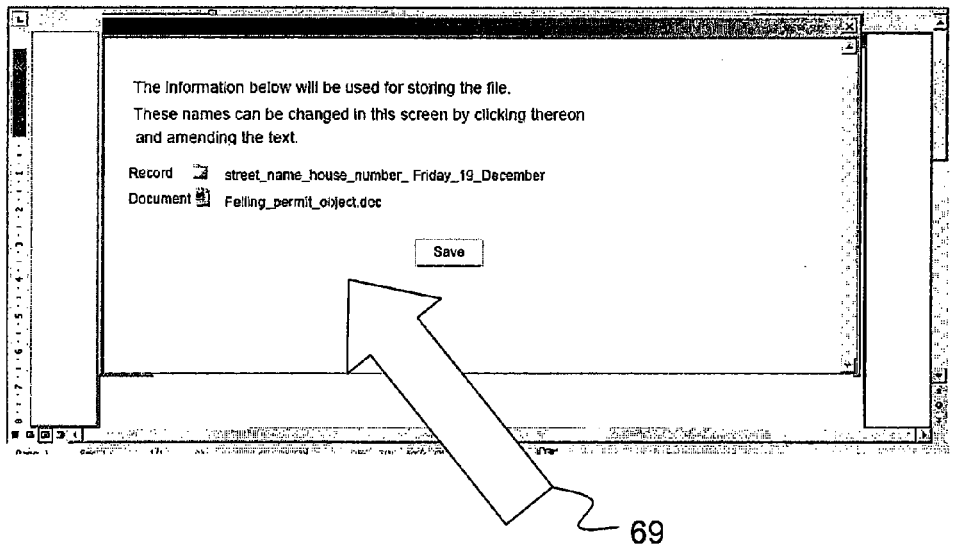

When the user confirms "Confirm", see the arrow 68 in FIG. 12, that he wishes to use this combination of relationships from the knowledge, object and relationship cards, this means that he accepts his selection and the process that will store the document is activated. He can also select "Cancel" on the display, which selection will take him back to the preceding step.

When the user confirms "Confirm" that he wishes to use this combination of relationships from the knowledge, object and relationship cards, this means that he accepts his selection and the process that will store the document is activated. He can also select "Cancel" on the display, which selection will take him back to the preceding step.

If he does not select this option, the (combined) name of the record as well as the file name to be chosen will be presented to the user. The file name will be completed on the card for the user on the basis of the selected steps. The composite elements of the record name and the file name are determined by the columns of the knowledge card that describe the storage level. The elements of the names are present both inside and outside (external objects and relations) of the knowledge card.

During storage of the document, a number of relations are established between the various cards:

1) In the first place, the whole of object relationships is taken from the knowledge card, and the values that the user has selected in his object relationship windows are used for forming the file name. The document name is made up of a number of attributes:

a) from the column "document subject" of the knowledge card in question, the subject of the document within the context/domain (process activity in this case);

b) from the associated (column) "document type", the type of document as laid down on the knowledge card;

c) from the object card, the object name (the related objects are linked at the level of the knowledge card; also refer to the foregoing);

d) from the relationship card, the name of the relationship (the related relationship cards are linked at the level of the knowledge card; also refer to the foregoing);

e) the date of opening (e.g. 30122003).

2) Subsequently, it is considered whether the record that is being defined on the basis of the knowledge card and the object relationships already exists within the system. After all, all the documents or correspondence of the object in question are stored centrally within the individual record.

a) If this is the case, the document is added to the virtual record folder in question;

b) If this is not the case, the virtual record folder is created on the basis of the following attributes:

the word in the column "record description" of the knowledge card in question, at the selected level of the knowledge card;
the object name from the object card;
the name of the relationship from the relationship card;
the date the first document was opened, in this case the month and the year of the document that is being stored.

The rule that applies here is that the data from the object relationship card are identical for both the record and the file name, but that the data from the knowledge card are specific for the level of storage (on account of the place on the knowledge card). If the user selects a deeper level on the knowledge card, he will be presented with different column values; the object relationship ("Jan Janssen") will remain the same at all times. See FIG. 13, arrow 69.

Figure 14:
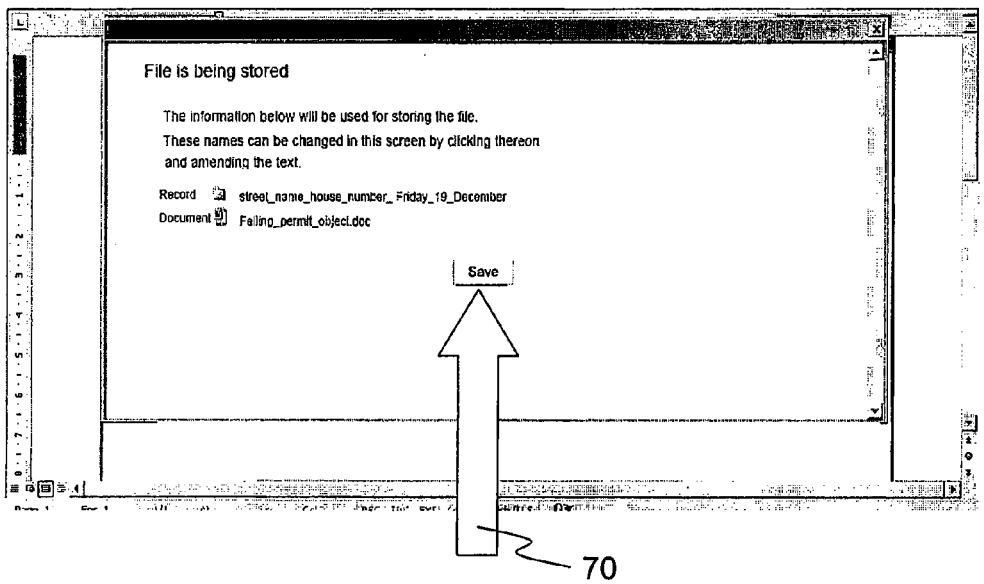

By clicking on the button "Save", see FIG. 14, arrow 70, the document is written to the storage layer with the chosen name ("Document") and record name ("Record") inclusive of the previously generated meta attributes. Meta attributes from the DIM being sent along are used for creating a link to the current document. At that point a unique document number is added to the document as well. (For the reader's information: this number can be configured by a manager).

When the linking of meta attributes from the DIM has taken place successfully, the document is written to the already existing virtual record folder on the basis of the generated file name in the library.

When the linking of meta attributes from the DIM has taken place successfully, the document is written to the existing virtual record folder on the basis of the generated file name in the library.

Figure 15:
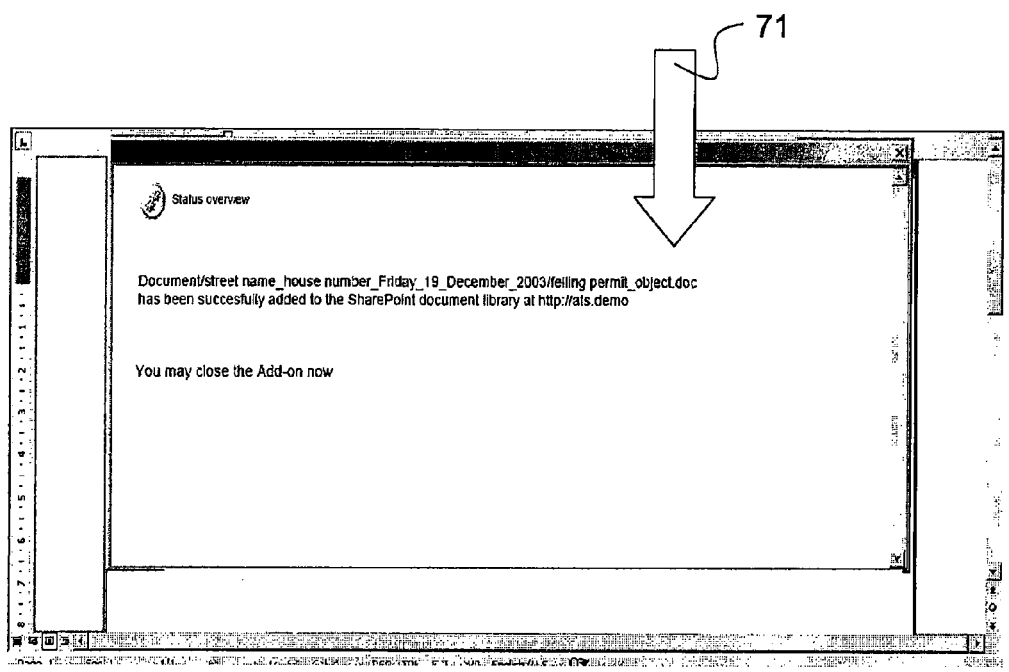

The result of the update is shown to the user, see FIG. 15, arrow 71.

Figure 16:
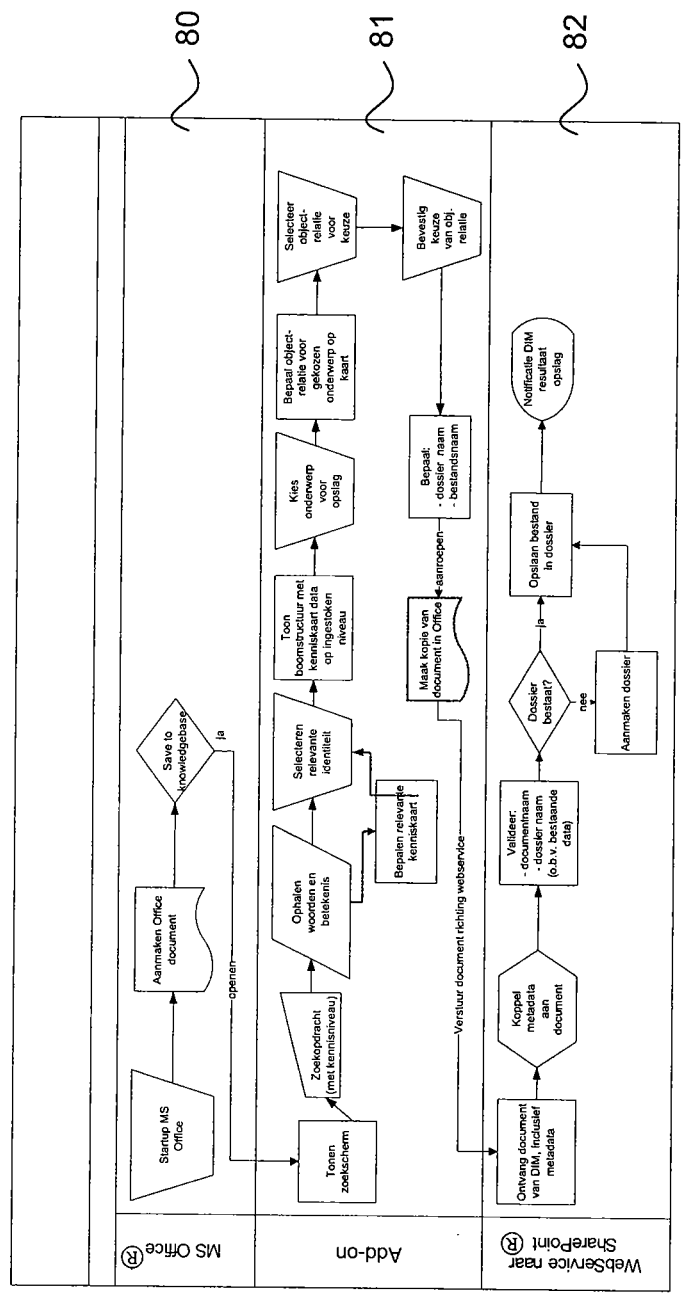
FIG. 16 schematically shows a flow diagram of the execution of the method in a computer application.

FIG. 16 shows the course of the process as discussed above and illustrated by means of the display images of the computer program or the computer program product for carrying out the method according to the invention as "Add-on" 81 to an MS Office® application 80 in a SharePoint® Web service 82 environment.

To those skilled in the art will appreciate that the method according to the invention as described above provides a significant improvement as regards the storage and retrieval of data files, in particular in the case of extensive information systems, the intended advantages being: speed, unequivocal and low-threshold, i.e. information processors are not required to have a knowledge of hierarchical folder structures and the like.

The invention claimed is:

1. A computer controlled method for storing a data file in a data memory, said method comprising the steps of:
   receiving, by said computer, data representing at least one structured set of predefined meta attributes not derived from said data file to be stored, such a structured set of predefined meta attributes being called a knowledge card, said meta attributes having a specific meaning and being defined in a specific context related to subjects and objects and relationships between said meta attributes by a grouping thereof based on at least one of a hierarchical and logical and associative relation;
   grouping in a matrix, under the control of said computer, said meta attributes comprised by a knowledge card;
   comprising in said matrix meta attributes related to subjects and meta attributes related with objects of the same knowledge card;
   storing, by said computer, said at least one knowledge card in an electronic storage device;
   receiving, by said computer, a search command for retrieving at least one knowledge card from said electronic storage device, said search command comprising a search term;
   retrieving, by said computer, at least one knowledge card from said electronic storage device, said retrieving being based on said search command;
   displaying, by said computer, data representing said at least one retrieved knowledge card;
   receiving, by said computer, data representing one of said at least one retrieved knowledge card;
   retrieving, by said computer, from said electronic storage device one knowledge card represented by said received data representing one of said at least one retrieved knowledge card;
   displaying, by said computer, said retrieved one knowledge card;
   receiving, by said computer, at least one meta attribute comprised by said retrieved one knowledge card;
   receiving, by said computer, said data file for storing in said data memory;
   assigning, by said computer, said received at least one meta attribute comprised by said retrieved one knowledge card to said data file for storing said data file in said data memory; and
   storing, by said computer, said data file in said data memory, said storing being based on said at least one meta attribute assigned to said data file;
   further comprising the steps of:
   receiving, by said computer, at least one meta attribute being comprised by a knowledge card stored in said electronic storage device;
   retrieving, by said computer, at least one data file stored in said data memory, said retrieving being based on said received at least one meta attribute being comprised by a knowledge card stored in said electronic storage device; and
   presenting, by said computer, said at least one retrieved data file,
   wherein said relationships between said meta attributes are in an arrangement of said meta attributes relative to each other in said matrix.

2. The computer controlled method according to claim 1, wherein said received at least one meta attribute for retrieving a data file stored in said data memory is comprised by said one knowledge card comprising said at least one meta attribute on the basis of which said respective data file has been stored.

3. The computer controlled method according to claim 1, wherein said at least one knowledge card is constituted by:
   at least one subject file comprising meta attributes related to subjects of the same knowledge card;
   at least one object file comprising meta attributes related to objects comprised of the same knowledge card; and
   wherein said at least one subject file and said at least object file are interrelated by said relationships between said meta attributes.

4. The computer controlled method according to claim 3, further comprising the step of:
   altering, under control of said computer, a meta attribute of at least one of a group comprising a knowledge card, a subject file and an object file, by a user, a computer application or a process.

5. The computer controlled method according to claim 1, further comprising the steps of:
   adding to said data file, by said computer, said at least one meta attribute assigned to said data file; and
   storing, by said computer, said data file and said at least one added meta attribute in said data memory.

6. The computer controlled method according to claim 1, further comprising the step of:
   associating with said data file, by said computer, said at least one meta attribute assigned to said data file by a unique link created by said computer.

7. The computer controlled method according to claim 1, further comprising the steps of:
   associating with said data file, by said computer, said at least one meta attribute assigned to said data file by a unique link created by said computer; and
   storing, by said computer, said unique link in a separate link file stored in a data memory.

8. The computer controlled method according to claim 7, further comprising the step of:
   storing, under control of said computer, said link file and said data file in at least one of separate data memories and in a same data memory.

9. The computer controlled method according to claim 1, wherein, by said computer, a meaning and a context assigned to structured meta attributes comprised by said at least one knowledge card stored in said knowledge card device are adapted and updated in said at least one knowledge card stored in said knowledge device.

10. The computer controlled method according to claim 1, further comprising the step of:
    altering, under control of said computer, a meta attribute assigned to a data file by a user, a computer application or a process.

11. A computer system for performing a computer controlled storing of data files in a data memory, the system comprising:
    a data a processor; and
    a data memory for storing data files therein under control of said data processor;
    an electronic storage device for storing at least one structured set of predefined meta attributes not derived from a data file to be stored, such a structured set of predefined meta attributes being called a knowledge card, said meta attributes having a specific meaning and being defined in a specific context related to subjects and objects and relationships between said meta attributes by a grouping thereof based on at least one of a hierarchical and logical and associative relation;

a device for grouping in a matrix, under the control of said computer, said meta attributes comprised by a knowledge card;
a device for comprising in said matrix meta attributes related to subjects and meta attributes related with objects of the same knowledge card;
a device for receiving a search command for retrieving at least one knowledge card from said electronic storage device, said search command comprising a search term;
a device for retrieving at least one knowledge card from said electronic storage device, said retrieving being based on said search command;
a device for displaying data representing said at least one retrieved knowledge card;
a device for receiving data representing one of said at least one retrieved knowledge card;
a device for retrieving from said electronic storage device one knowledge card represented by said received data representing one of said at least one retrieved knowledge card;
a device for displaying said retrieved one knowledge card;
a device for receiving at least one meta attribute comprised by said retrieved one knowledge card;
a device for receiving a data file for storing in said data memory;
a device for assigning said received at least one meta attribute comprised by said retrieved one knowledge card to said data file for storing said data file in said data memory;
a device for storing said data file in said data memory, said storing being based on said at least one meta attribute assigned to said data file; and further comprising:
a device for receiving at least one meta attribute being comprised by a knowledge card stored in said electronic storage device;
a device for retrieving at least one data file stored in said a data memory, said retrieving being based on said received at least one meta attribute being comprised by a knowledge card stored in said electronic storage device; and
a device for presenting said at least one retrieved data file,
wherein said relationships between said meta attributes are in an arrangement of said meta attributes relative to each other in said matrix.

12. The system according to claim 11, wherein said data processor comprises:
said device for assigning at least one meta attribute to said data file,
said device for storing said data file on the basis of at least one meta attribute assigned thereto,
said device for receiving at least one meta attribute being comprised by a knowledge card, and
said device for retrieving at least one data file stored in said data memory based on the received at least one meta attribute.

13. A computer program product comprising program code for reading by a computer for performing computer controlled storing of a data file in a data memory, when said computer program product comprises:
program code means for receiving, by said computer, data representing at least one structured set of predefined meta attributes not derived from said data file to be stored, such a structured set of predefined meta attributes being called a knowledge card, said meta attributes having a specific meaning and being defined in a specific context related to subjects and objects and relationships between said meta attributes by a grouping thereof based on at least one of a hierarchical and logical and associative relation;
program code means for grouping in a matrix, under the control of said computer, said meta attributes comprised by a knowledge card;
program code means for comprising in said matrix meta attributes related to subjects and meta attributes related with objects of the same knowledge card;
program code means for storing, by said computer, said at least one knowledge card in an electronic storage device;
program code means for receiving, by said computer, a search command for retrieving at least one knowledge card from said electronic storage device, said search command comprising a search term, said search term;
program code means for retrieving, by said computer, at least one knowledge card from said electronic storage device, said retrieving being based on said search command;
program code means for displaying, by said computer, data representing said at least one retrieved knowledge card;
program code means for receiving, by said computer, data representing one of said at least one retrieved knowledge card;
program code means for retrieving, by said computer, from said electronic storage device said one knowledge card represented by said received data representing one of said at least one retrieved knowledge card;
program code means for displaying, by said computer, said retrieved one knowledge card;
program code means for receiving, by said computer, at least one structured meta attribute comprised by said retrieved one knowledge card;
program code means for receiving, by said computer, said data file for storing in said data memory;
program code means for assigning, by said computer, said received at least one meta attribute comprised by said retrieved one knowledge card to said data file for storing said data file in said data memory; and
program code means for storing, by said computer, said data file in said data memory, said storing being based on said at least one meta attribute assigned to said data file, further comprising:
program code means for receiving, by said computer, at least one meta attribute being comprised by a knowledge card stored in said electronic storage device;
program code means for retrieving, by said computer, at least one data file stored in said a data memory, said retrieving being based on said received at least one meta attribute being comprised by a knowledge card stored in said electronic storage device; and
program code means for presenting, by said computer, said at least one retrieved data file,
wherein said relationships between said meta attributes are in an arrangement of said meta attributes relative to each other in said matrix.

14. The computer program product according to claim 13, wherein said computer program product is arranged for integration in or addition to a computer application for storing of a data file in a data memory, when said computer program is being executed by said computer in conjunction with said computer application.

15. The computer program product according to claim 13, loaded in a main memory of a computer and is executed by said computer.

16. The computer program product according to claim 13, wherein said computer program product is arranged for integration in or addition to a computer application for storing of a data file in a data memory, when said computer program product is loaded in a main memory of said computer and is executed by said computer.

\* \* \* \* \*